(12) United States Patent
Thomas (10) Patent No.: US 9,508,322 B2
(45) Date of Patent: Nov. 29, 2016

(54) TEXT BOX RESIZING

(75) Inventor: Christopher Thomas, Richmond, CA (US)

(73) Assignee: QUALCOMM Incorporated, San Diego, CA (US)

( * ) Notice: Subject to any disclaimer, the term of this patent is extended or adjusted under 35 U.S.C. 154(b) by 751 days.

(21) Appl. No.: 12/790,673

(22) Filed: May 28, 2010

(65) Prior Publication Data

US 2011/0292084 A1  Dec. 1, 2011

(51) Int. Cl.
*G09G 5/00* (2006.01)
*G09G 5/26* (2006.01)
*G06F 3/0488* (2013.01)
*G09G 5/08* (2006.01)

(52) U.S. Cl.
CPC ............... *G09G 5/26* (2013.01); *G06F 3/0488* (2013.01); *G09G 5/08* (2013.01); *G09G 2340/045* (2013.01); *G09G 2340/145* (2013.01)

(58) Field of Classification Search
CPC ............. G09G 2340/0407; G09G 2340/0414; G09G 2340/0421; G06T 3/40; G06F 3/0481

USPC ...................... 345/472, 472.2, 660, 661, 671
See application file for complete search history.

(56) References Cited

U.S. PATENT DOCUMENTS

| 8,448,082 B2 * | 5/2013 | Yoon ..................... G06F 3/0481 |
| | | 715/773 |
| 2008/0178098 A1 * | 7/2008 | Yoon et al. ................... 715/762 |
| 2011/0157069 A1 * | 6/2011 | Zhuang et al. ............... 345/174 |
| 2012/0266069 A1 * | 10/2012 | Moshiri et al. ............... 715/719 |

* cited by examiner

*Primary Examiner* — Todd Buttram
(74) *Attorney, Agent, or Firm* — Kilpatrick Townsend & Stockton LLP

(57) ABSTRACT

A system, method, and computer readable medium are disclosed for re-sizing input fields and text of a user interface displayed within a touch-sensitive screen. The user interface comprises an initial view with at least one input field. The user interface is provided for display on the screen. A touch interaction is detected on the screen, and it is determined whether the interaction is within a predefined area of an input field. Responsive to determining that the interaction is within the predefined area, a magnified view of the input field is generated. The magnified view increases the proportion of the screen filled by the input field and text relative to the initial view. The magnified view is then presented for display on the screen.

19 Claims, 6 Drawing Sheets

TEXT BOX RESIZING

BACKGROUND

1. Field of Art

The disclosure generally relates to the field of visual presentation on screens, and more specifically, to the visual presentation of input fields.

2. Description of Art

Computing devices with small screens, for example, smartphones and functionality enhanced mobile phones, are well known. Such computing devices include screens that display network and application user interfaces, for example, web browser pages or applets. These user interfaces may have a large volume of information including multiple text input fields within the rendered user interface. Moreover, the screens are configured to be touch sensitive to allow direct interaction with the user interface through the screen.

One problem with having such input fields within a rendered user interface is that the input fields are often difficult to use because of their small size. The small size of input fields makes it difficult to place a cursor for text entry into the input field. Further, text typed into the input fields is difficult to read due to the small viewing area and small font size of the text. Hence, a user is required to have very fine motor skills in order to place a cursor inside an input field, and very good eyesight in order to read the text of the input field.

One attempt to address the shortcomings of the art has been to allow a user to manually increase the zoom of the user interface being rendered. However, this requires that the user manually zoom in and out after entering text in each input field. Often there are many sequential input fields that the user must enter text into in order to obtain a desired result. As a result, it is time consuming to perform a manual zoom action to switch between input fields. Further, the user require considerable dexterity in performing a zoom action in certain hardware configurations, such as touch sensitive screens requiring zoom gestures. Users lacking such dexterity often tire from the process of manually applying a zoom function to access the input field. Moreover, still many user interfaces lack mechanisms to allow zooming, hence, making access to such input field almost prohibitable.

Hence, the art lacks, inter alia, a mechanism for automatically re-sizing input fields of a user interface without requiring interacting with application commands for zooming.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Example Overview

One embodiment of a disclosed system (or apparatus or method or computer readable storage medium) is configured to re-size text input fields of a user interface displayed within a screen, for example, a touch screen of a smartphone. By way of example, in one embodiment a system is configured to re-size input fields and text of a user interface displayed within a small form factor, touch-sensitive screen. The system provides for display on a touch sensitive screen a user interface. The user interface comprises an initial view with at least one input field.

The system detects an interaction on the touch sensitive screen and determines whether the interaction is within a predefined area of an input field. If the interaction is within the predefined area, the system in one embodiment determines whether a cursor is present in the input field. Accordingly, responsive to determining that the cursor is present in the input field, the system detects text entry in the input field and generates a magnified view. The magnified view increases a proportion of the screen filled by the input field and the text entered in the input field relative to the initial view. In instances in which the system determines that the cursor is not present in the input field, the system generates the magnified view and provides, for display on the screen, the magnified view. The system then detects placement of the cursor in the input field and a text entry in the input field.

Example Mobile Computing Device

Figure 1A:
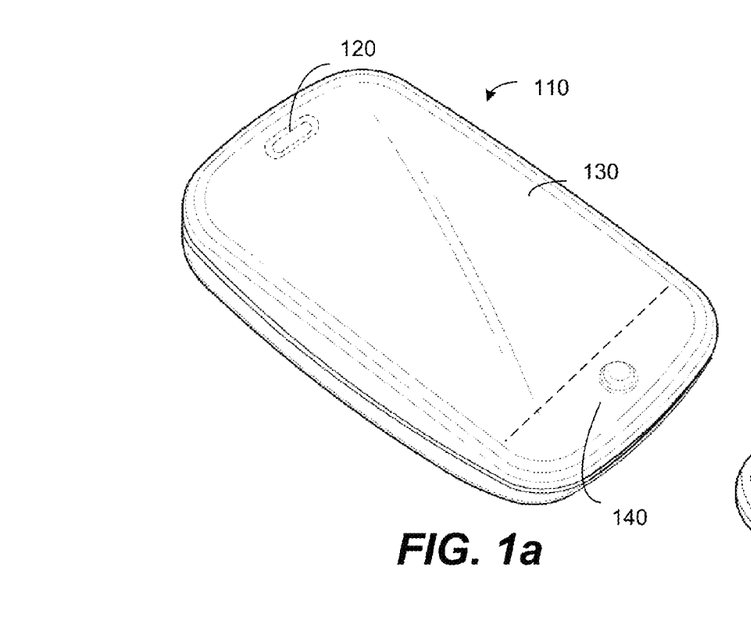
FIG. 1a illustrates one embodiment of a mobile computing device in a first positional state.
Figure 1B:
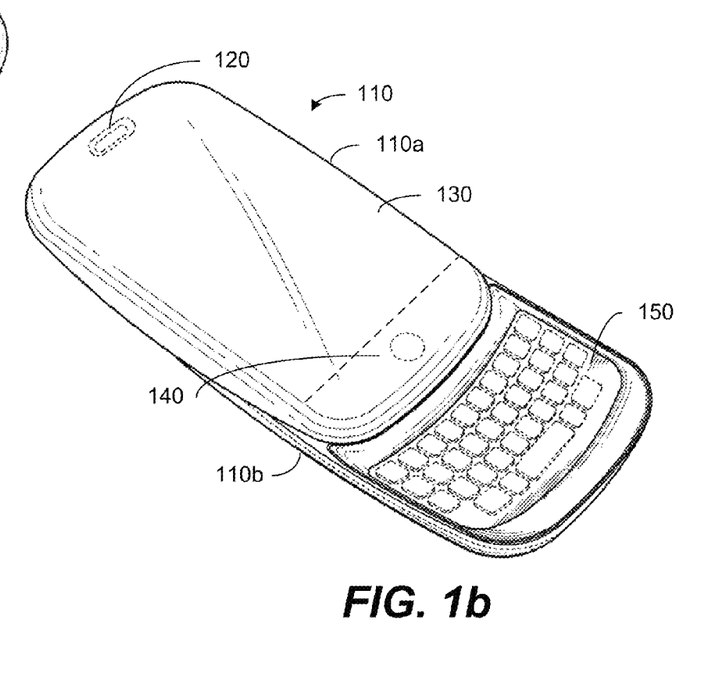
FIG. 1b illustrates one embodiment of the mobile computing device in a second positional state.

In one example embodiment, the configuration as disclosed may be configured for use with any computing device having a screen, particularly a small form factor screen such as one found on a smartphone, media player or tablet computer. For ease of discussion, the embodiments disclosed will be described in the context of a mobile computing device, but would be applicable to other computing devices having screens, particularly those with touch sensitive screens. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. The principles disclosed herein may also be applied to devices lacking telephonic functionality. Likewise, the mobile computing device 110 is only by way of example, and the principles of its functionality apply to other computing devices that are configured to use screens, e.g., tablet computers such as IPAD, desktop computers, server computers, media players, and the like, particularly those having touch sensitive screens.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AM-LCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive screen (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
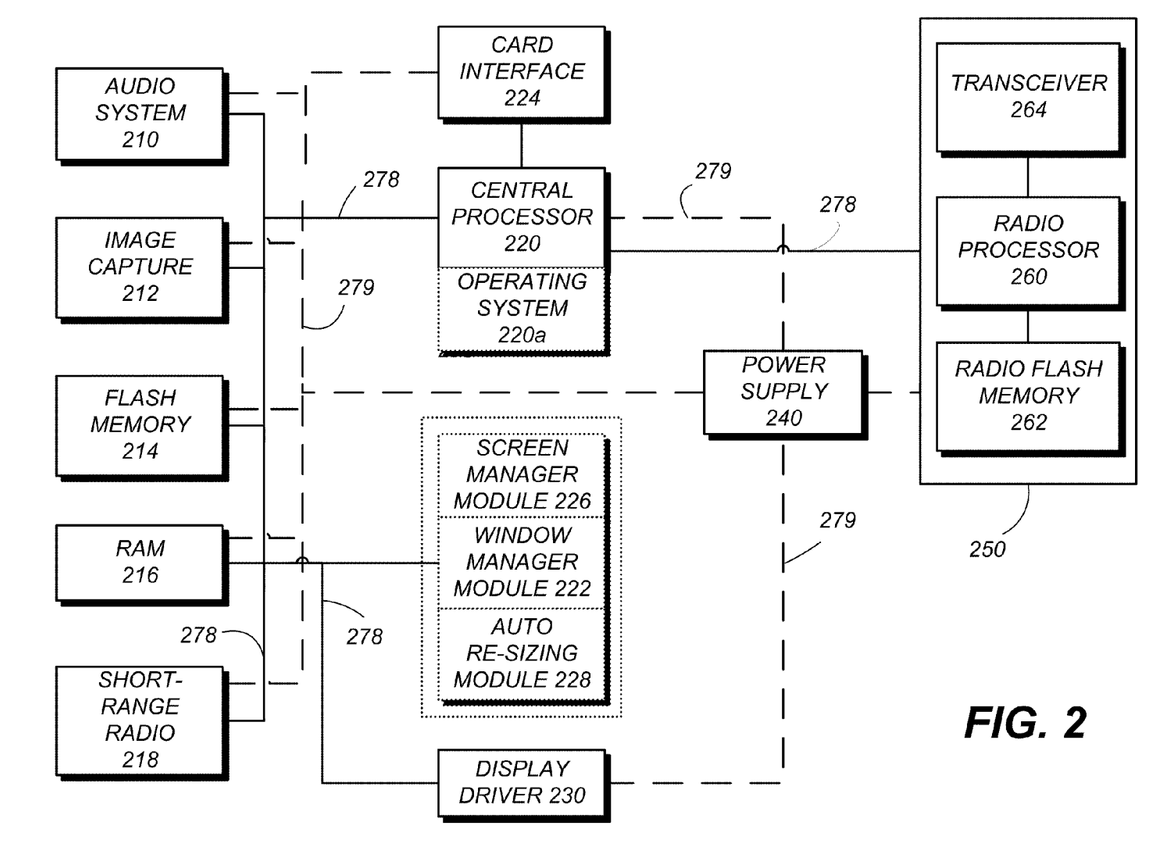
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An auto re-sizing module 228 comprises software that is, for example, integrated with the operating system or configured to be an application operational with the operating system. In some embodiments it may comprise firmware, for example, stored in the flash memory 214. The auto re-sizing module 228 is configured to magnify (or enlarge or zoom or re-size) an input field shown on a screen 130 as further disclosed herein.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), Long Term Evolution (LTE), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Auto Re-Sizing Module

Figure 3:
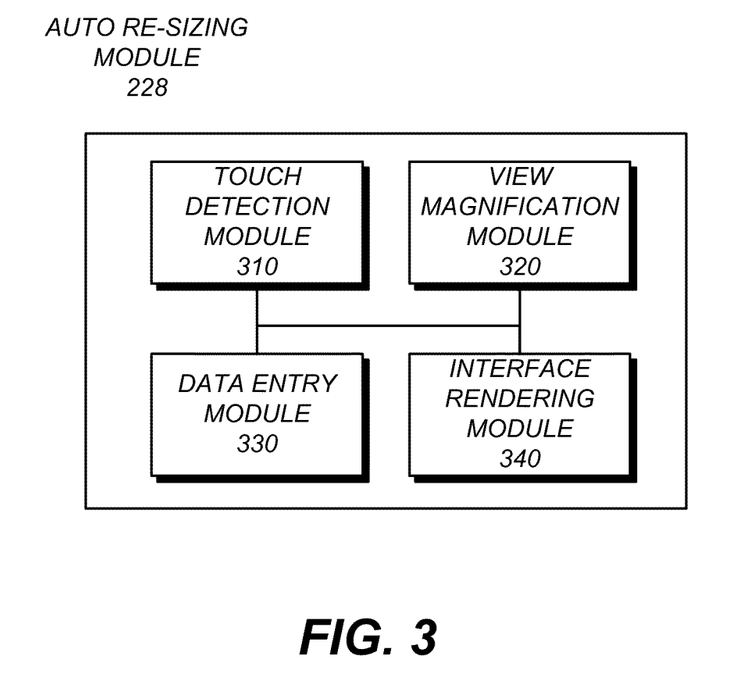
FIG. 3 illustrates one embodiment of an architecture for automatic re-sizing of input fields.

FIG. 3 illustrates one embodiment of a logical view of the automatic re-sizing module 228. As previously noted, the automatic re-sizing module 228 is configured to magnify (or enlarge, zoom or re-size) an input field shown as part of a rendered user interface on a screen 130. The automatic re-sizing module 228 comprises a touch detection module 310, a view magnification module 320, a data entry module 330, and an interface rendering module 340.

The touch detection module 310 is configured to correlate detected touch actions with input fields displayed on the screen 130 in order to determine which particular input field to re-size. The touch detection module 310 receives data corresponding to an indication of a touch action on the screen 130 by a finger (or some object corresponding to triggering the touch sensitive screen such as a stylus or touch screen pen). Touch actions include, for example, a single tap or a double tap action on the screen 130. The touch detection module 310 measures touch parameters corresponding to the touch. Examples of touch parameters include measurement of a touch area, for example, a radius, diameter, perimeter, length and width in pixels, and/or a center point pixel representing the center point of the touch on the screen.

The touch detection module 310 saves the touch parameters, e.g., the touch area perimeter and the center point pixel on the touch screen 130. In one embodiment, the saved touch parameters are stored in the flash memory 214 of the mobile computing device 110. The touch detection module uses the touch parameters to associate the touch action with a single input field that will be magnified by the other modules within the auto re-sizing module 228.

The touch detection module 310 can perform the association in several ways, depending on which touch parameters are used. For example, if the touch area is represented by the touch parameters as a length and width in pixels, the magnified input field will be the one with the most pixel overlap between the current display of the input field on the screen 130 and the touch area. In another example, if the touch area is represented by the touch parameters as a center point pixel, the magnified input field will be the one closest in proximity to the center point pixel. Proximity can be based on the center point of the input field on the user interface, or simply any point within the pixel area of the input field. The touch detection module 310 only associates an input field with a touch action if the touch action is within a fixed number of pixels of an input field. If not, no action is taken.

It may be necessary to disambiguate between two nearby input fields, for example when two input fields are stacked vertically on the user interface and the detected touch action falls directly between the two input fields. The touch detection module 310 may be configured to use several criteria in order to determine which input field to magnify. For example, in the case of confusion, the touch detection module 310 may be configured to select the input field located closest to the upper right corner of the screen 130. The touch detection module 310 may also be configured to select the first input field from the top of the screen 130 downward that does not already have text entered inside it.

The auto re-sizing module 228 further comprises a view magnification module 320 configured to determine how much to adjust the size of the selected input field and the size of any text typed in the input field, so that the input field is easier to type in and read. The amount of the magnification can be based on a number of factors. For example, the input field may be magnified to fill the screen width, to fill the screen height, or to meet a certain minimum text font size, or some combination of each.

The view magnification module 320 also determines a center point around which to perform the magnification. The center point determines what other portions of the user interface will also be visible to the user in addition to the magnified view of the input field. For example, some input fields present in the user interface may contain prompts that assist a user in filling in the input field, and it may be desirable to make sure that these prompts remain visible despite the magnification. Through selection of the center point of the magnification, these prompts can be kept in view with the re-sized input field.

The view magnification module 320 further determines the font size of any text entered in the magnified input field. In one embodiment, the font size of the text in the input field may be magnified in the same proportion as the selected input field. In another embodiment, the text size is changed to a new size independent of the magnification of the input field.

The auto re-sizing module 228 further comprises an interface rendering module 340 configured to adjust the user interface displayed on the screen 130 in order to magnify the input field and the text inside. The interface rendering module 340 takes the information determined by the touch detection module 310 and the view magnification module 320, and uses it to perform the magnification. In one embodiment, the interface rendering module 340 communicates with the screen manager module 226 and the window manager module 222 in order to re-render the input field and surrounding material of the user interface consistent with the determined magnification of the input field and text. In an alternate embodiment, the interface rendering module 340 can directly re-render the input field and surrounding material of the user interface consistent with the determined magnification of the input field and text.

The auto re-sizing module 228 further comprises a data entry module 330 configured to record text data entered into the magnified input field. The data entry module 330 records and saves all text entered into the magnified input field in the same manner as is performed by the user interface regarding an unmagnified input field.

The data entry module 330 is further configured to detect the presence of a cursor inside of an input field. Cursors indicate the location where text entered will appear within an input field. In one embodiment, the data entry module 330 communicates with the touch detection module 310 so that the touch detection module can determine when to magnify an input field that has an associated touch action. If the touch action results in a cursor being placed in the input field, the magnification will occur once typing is detected by the data entry module 330. Alternatively, if the touch action does not result in a cursor being placed in the input field, magnification will occur automatically so that it is easier to place a cursor in the magnified field.

The data entry module 330 is further configured to determine when the user is finished entering text. The data entry module 330 determines that a user is finished entering text by detecting a completion action. Completion actions include, for example, a double tap touch action on the magnified input field displayed on the screen 130, double or single tapping the next input field that is located below the magnified input field displayed on the screen 130, or a touch interaction with a "submit" style button displayed on the screen 130.

Responsive to the type of completion action, the data entry module 330 re-renders the user interface on the screen 130 of the mobile computing device. If the completion event indicates the user wishes to return to the unmagnified view of the user interface, the data entry module 330 communicates in one embodiment with the screen manager 226 and the window manager module 222 to re-render this initial view of the user interface. If the completion event indicates the user wishes to submit the entered text data, then the data entry module 330 communicates with the screen manager module 226 and the window manager module 222 to submit the text data and render the correct next screen, as determined by the user interface. If the completion event indicates the user wishes to re-center the view of the user interface on the next input field located next to the magnified input field, the data entry module 330 communicates with the view magnification module 320 and the interface rendering module 340 in order to render a similarly magnified view of the user interface focused on the next input field.

Auto Re-Sizing Operation

Figure 4:
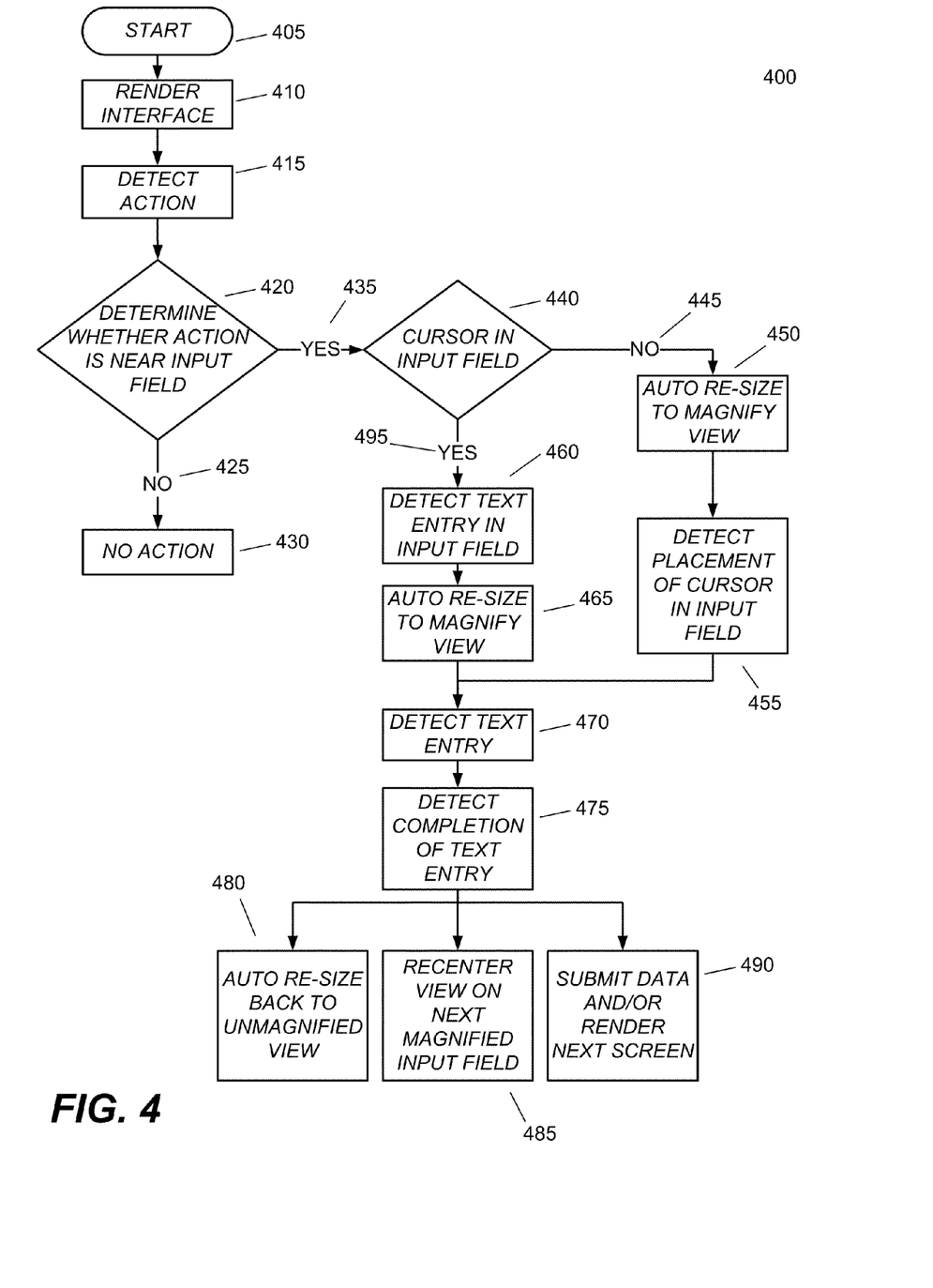
FIG. 4 illustrates one embodiment of a process for automatically re-sizing an input field in order to assist text entry.

FIG. 4 illustrates one embodiment of a process for automatically re-sizing an input field. The process starts 405 by rendering 410 the user interface, including one or more input fields, on the screen 130 of a mobile computing device. The process detects 415 a touch action and determines 420 whether the touch action is near one of the input fields displayed as part of the user interface. If the touch action is determined 425 to not be near any of the input fields, then no action 430 is taken.

If the touch action is determined 435 to be near one of the input fields, then the process must determine whether the touch action caused a cursor to be placed 440 in the input field. If the touch action was determined 440 to be close enough to place a cursor in the input field, the process awaits text entry in the input field. When the process detects 460 text entry in the input field, the process automatically re-sizes 465 the input field and surrounding user interface. If the touch action was not close enough 445 to place a cursor in the input field, the process automatically re-sizes 450 the input field and surrounding user interface. The process then awaits the detection 455 of the placement of a cursor in the input field via another tap action inside the magnified input field.

At this point, regardless of how the magnification occurred the process detects 470 entry of text, e.g., by the user, within the input field. When the process detects 475 a completion action signifying that text entry within the field is completed and another action may be awaiting, the process responds based on the completion action. If the action indicates a return to the unmagnified view of the input field and user interface, the process automatically re-sizes 480 the user interface back to the original view. If a touch action is detected on a next input field, then the process re-centers 485 the magnified view on the next input field. Finally, if a touch action is detected, for example, on a "submit" style button provided by the user interface, the process 490 submits the entered text data and/or renders the next screen of the user interface.

Auto Re-Sizing Example

Figure 5A:
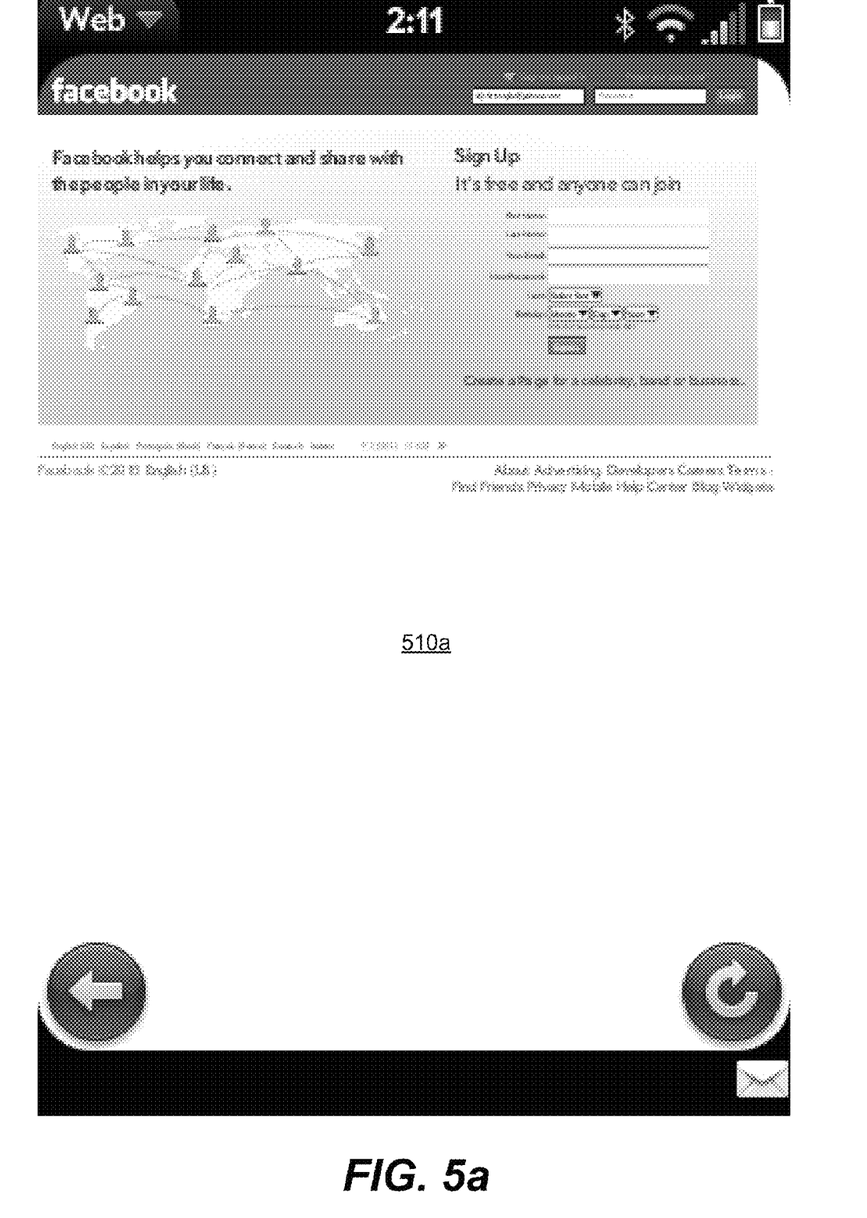
FIG. 5a illustrates one embodiment of an example user interface displaying input fields prior to automatic re-sizing.
Figure 5B:
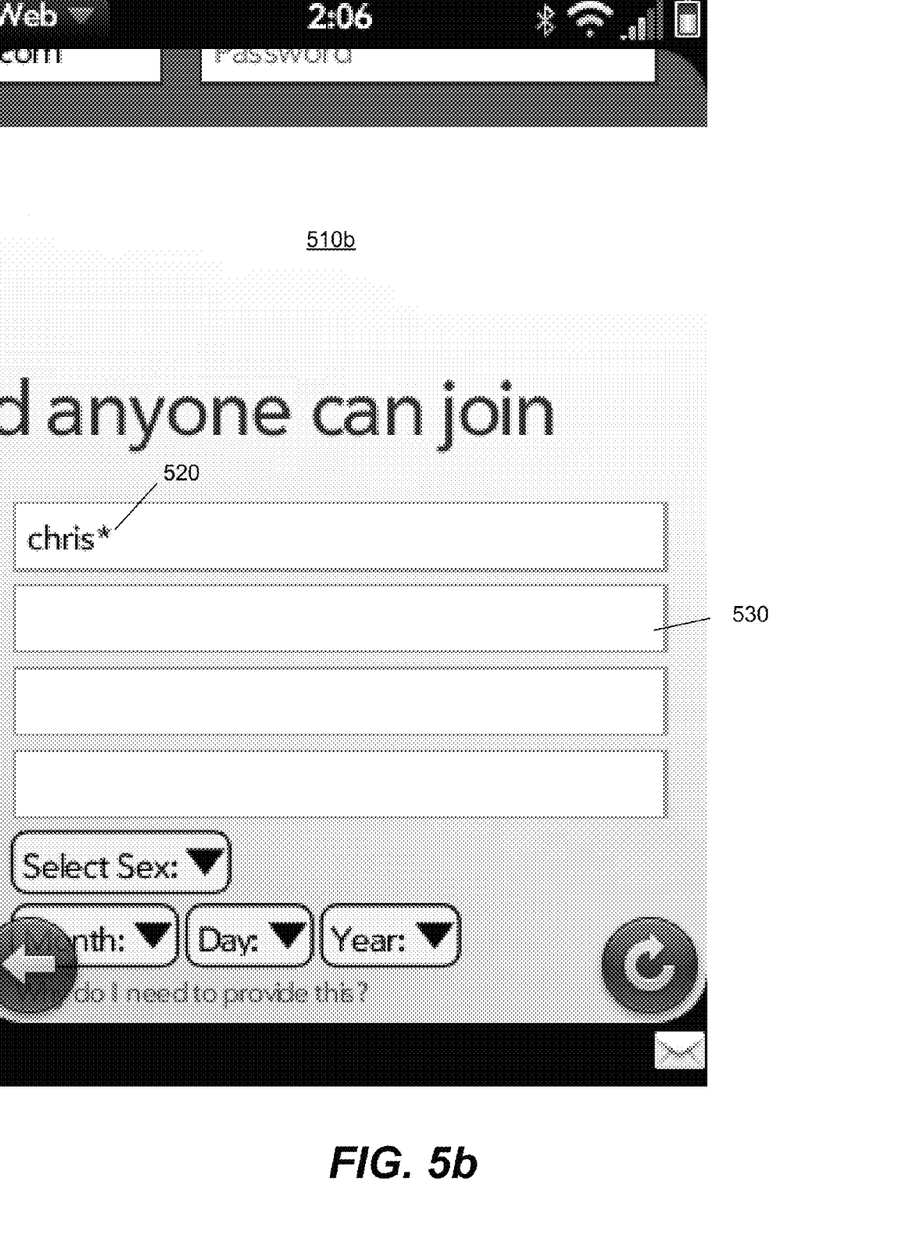
FIG. 5b illustrates one embodiment of an example user interface displaying input fields after automatic re-sizing of one input field.

FIGS. 5a and 5b illustrate one embodiment of example of a user interface configured to implement the auto re-sizing of input fields on the screen 130 of the mobile computing device based on the process described above. FIG. 5a illustrates the original user interface view 510a presented (displayed) on the screen 130 of the mobile computing device. In this example, a login screen for the FACEBOOK website is populated with several input fields. Each input field is capable of receiving text entry. However, the user interface is so large relative to the size of the screen such that when it is scaled down it is difficult to read the text on the screen, or place a cursor inside one of the input fields, for example, by detection of the touch of a finger, a stylus, or touch pen.

If a user taps on or near one of the input fields present on the user interface 510a, one of two things can happen. First, if the user successfully taps on an input field directly, a cursor is placed inside the tapped input field so that the user may enter text into that input field. If on the first tap the user successfully placed the cursor inside the input field, then upon typing text or upon subsequent tap within the input field, the auto re-size module 310 magnifies the tapped input field. Second, if the user only manages to tap near the input field, the auto re-size module 310 magnifies the tapped input field without waiting for subsequent taps.

FIG. 5b illustrates the magnified view of the user interface 510b surrounding tapped input field. In the example of FIG. 5b, the magnified input field 520 fills horizontal width of the screen 130. The user may now entered the desired text into the magnified input field. The user may indicate that they are finished entering text in one of several ways, and depending upon what the user does the user interface responds differently. In this example, if the user taps the next input field 530, the user interfaces re-renders and focuses the magnified view on the next input field. If the user taps the magnified input field (now containing text) again, the user interface re-renders the original, unmagnified view 510a of the user interface on the screen 130. In this instance, there is no submit button present in the magnified view that the user can tap on, however if it were present tapping on it would cause the user to be logged in to the FACEBOOK website.

The configuration for auto re-sizing as described herein beneficially provides automatic re-sizing of an input field of a user interface in order to assist in both user interface legibility and text entry. The configurations disclosed provide for expanded recognition of touch interactions near an input field, interactions that would otherwise not be associated with the input field due to their lack of precision. Automatic magnification of the user interface around the input field facilitates easier use of the input field by further removing the precision requirement for cursor placement and text entry. Hence, the configurations as disclosed provide ease of use and interaction with user interfaces that may be rendered within small viewing areas or screens.

Furthermore, the automatic magnification of the disclosed embodiments is not difficult to activate. Merely interacting with the user interface near the input field will trigger the magnification. Additionally, as the amount of magnification is automatically determined, the disclosed embodiments remove the need for manual zooming to accomplish the same task. The automatic magnification is simple to exit out of as well, and the disclosed embodiments discuss several techniques for returning to an unmagnified view. Thus, the disclosed embodiments reduce the number of steps required to interact with an input field in addition to increasing their ease of use.

Additional Considerations for Auto Re-Sizing

Some portions of the above describe auto re-sizing of input fields in the context of devices with touch sensitive screens, wherein the automatic re-sizing occurs responsive to touch interactions detected by the touch detection module 310. The disclosed embodiments will work with more than merely touch sensitive screens, and the disclosed embodiments cover all user interface situations where input fields are too displayed at too small a size to be used effectively.

In one example embodiment, a screen (or monitor) and the displayed input field are relatively large in an absolute sense compared to what their counterparts would look like on a mobile computing device 110. In one example, the screen is large screen TV attached to a computing device, for example a desktop computer or gaming console such as NINTENDO WII (not shown). In this example embodiment a user may be standing a greater distance (e.g., 4-5 meters) from the screen 130. At such distances the input field appears may appear small and could be difficult to see.

In this example embodiment, the screen may not be touch sensitive, but may be part of a configuration that includes motion sensor hardware to detect input transmitted from a source and displayed on the screen. The motion sensor hardware may comprise, for example, an infrared detector that senses and triangulates motion from an external source. In this example embodiment, the touch detection module 310 is configured to accept motion sensor input, and to convert that to the location of a pointer on the screen. The touch detection module 310 is further configured to accept interactions based on input from the external source and the location of the pointer on the screen. In one embodiment, the input comprises instructions to select or place a cursor inside an input field displayed on the screen, in a manner consistent with the embodiments described above. Thus, even though the form of input to the screen has changed, the disclosed embodiments handle the detection of input and corresponding auto re-sizing on the screen in the same way. For example, the data entry area is automatically zoomed in as described previously and returned back to the original view (e.g., zoomed back out) once entry is completed.

Some portions of the above description describe the embodiments in terms of algorithms and symbolic representations of operations on information, for example, as illustrated and described with respect to FIGS. 3 and 4. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatic re-sizing of input fields of a user interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for re-sizing text of a user interface displayed within a touch-sensitive screen, the method comprising:
   providing, for display on the touch sensitive screen, the user interface comprising an initial view with at least one input field;
   detecting a first interaction on the touch sensitive screen;
   determining whether the first interaction is within a predefined area surrounding and including an input field;
   determining, responsive to determining that the first interaction is within the predefined area, whether a cursor is present in the input field;
   responsive to determining, subsequent to determining that the first interaction is within the predefined area, that the cursor is present in the input field;
   detecting text entry in the input field;
   generating a magnified view, the magnified view increasing a portion of the screen filled by the input field and the text entered in the input field; and
   providing the magnified view for display on the screen;
   detecting a second interaction on the touch sensitive screen;
   determining whether the second interaction is within the predefined area surrounding and including the input field;
   determining, responsive to determining that the second interaction is within the predefined area, whether the cursor is present in the input field; and
   responsive to determining that the cursor is not present in the input field;
   generating a magnified view, the magnified view increasing the portion of the screen filled by the input field and the text entered in the input field;

providing the magnified view for display on the screen;
detecting placement of the cursor in the input field;
detecting text entry in the input field; and
detecting completion of text entry.

2. The method of claim 1, further comprising
responsive to detecting completion of text entry, providing the initial view for display on the screen.

3. The method of claim 1, further comprising responsive to detecting completion of text entry, generating a second magnified view of a second input field; and providing the second magnified view for display on the screen.

4. The method of claim 1, wherein the predefined area extends a predetermined number of pixels around the input field.

5. A computer implemented method for re-sizing text of a user interface displayed within a touch-sensitive screen, the method comprising:
providing, for display on the touch sensitive screen, the user interface comprising an initial view with at least one input field;
detecting a first interaction on the touch sensitive screen;
determining whether the first interaction is within a predefined area surrounding and including an input field;
modifying a view for display on the screen;
detecting a second interaction on the touch sensitive screen;
determining whether the second interaction is within the predefined area surrounding and including the input field;
determining, responsive to determining that the second interaction is within the predefined area, whether a cursor is present in the input field; and
responsive to determining that the cursor is not present in the input field:
  generating a magnified view, the magnified view increasing the portion of the screen filled by the input field and the text entered in the input field;
  providing the magnified view for display on the screen;
  detecting placement of the cursor in the input field;
  detecting text entry in the input field;
  detecting completion of text entry; and
  in response to detecting the completion of the text entry, modifying a view for display on the touch sensitive screen.

6. The method of claim 5, wherein responsive to determining that the interaction is within the predefined area;
determining whether a cursor is present in the input field;
responsive to determining that the cursor is present in the input field, detecting text entry in the input field; and
responsive to detecting text entry in the input field, generating the magnified view.

7. The method of claim 5, wherein responsive to determining that the interaction is within the predefined area;
determining whether a cursor is present in the input field;
responsive to determining that the cursor is not present in the input field, generating the magnified view; and
detecting placement of the cursor in the input field.

8. The method of claim 5, further comprising detecting text entry in the input field; and detecting completion of text entry.

9. The method of claim 8, further comprising responsive to detecting completion of text entry, providing the initial view for display on the screen.

10. The method of claim 8, further comprising
responsive to detecting completion of text entry, generating a second magnified view of a second input field; and
providing the second magnified view for display on the screen.

11. The method of claim 5, wherein the predefined area is within a predetermined number of pixels of the input field.

12. A non-transitory computer readable medium configured to store instructions, the instructions when executed by a processor cause the processor to:
provide, for display on a touch sensitive screen, a user interface comprising an initial view with at least one input field;
detect a first interaction on the touch sensitive screen;
determine whether the first interaction is within a predefined area surrounding and including an input field;
determine, responsive to a determination that the interaction is within the predefined area, whether a cursor is present in the input field;
responsive to a determination that the cursor is present in the input field:
  detect text entry in the input field;
  generate a magnified view, the magnified view increasing a portion of the screen filled by the input field and text entered in the input field; and
  provide the magnified view for display on the screen;
detecting a second interaction on the touch sensitive screen;
determining whether the second interaction is within the predefined area surrounding and including the input field;
determining, responsive to determining that the second interaction is within the predefined area, whether a cursor is present in the input field; and
responsive to a determination that the cursor is not present in the input field:
  generate a magnified view, the magnified view increasing the portion of the screen filled by the input field and the text entered in the input field;
  provide the magnified view for display on the screen;
  detect placement of the cursor in the input field;
  detect text entry in the input field; and
  detect completion of text entry; and
  in response to detecting the completion of the text entry, altering a view of the display of the touch sensitive screen.

13. The non-transitory computer readable medium of claim 12, further comprising instructions that cause the processor to:
provide, responsive to detecting completion of text entry, the initial view for display on the screen.

14. The non-transitory computer readable medium of claim 12, further comprising instructions that cause the processor to:
generate, responsive to detecting completion of text entry, a second magnified view of a second input field; and
provide the second magnified view for display on the screen.

15. The non-transitory computer readable medium of claim 12, wherein the predefined area extends a predetermined number of pixels around the input field.

16. A device for re-sizing text of a user interface, comprising:
a touch sensitive screen, adapted to display the user interface comprising an initial view with at least one input field, and to detect a first interaction and a second interaction on the touch sensitive screen;
a touch detection module adapted to determine whether the first or the second interaction is within a predefined area surrounding including an input field;

a data entry module adapted to:
  determine, responsive to a determination that the first interaction is within the predefined area, whether a cursor is present in the input field;
  detect, responsive to a determination that the cursor is present in the input field, text entry in the input field;
  determine, responsive to a determination that the second interaction is within the predefined area, whether a cursor is present in the input field;
  detect, responsive to a determination that the cursor is not present in the input field, placement of the cursor in the input field;
  detect text entry in the input field; and
  detect a completion of text entry;
a view magnification module adapted to:
  responsive to an indication that the cursor is present in the input field for the first interaction, generate a first magnified view responsive to a determination that the interaction is within the predefined area, the first magnified view increasing a portion of the screen filled by the input field and text entered in the input field;
  responsive to an indication that the cursor is not present in the input field for the second interaction, generate a second magnified view responsive to a determination that the interaction is within the predefined area, the second magnified view increasing a portion of the screen filled by the input field;
  receive an indication of placement of the cursor in the input field;
  receive an indication of text entry in the input field; and
  receive an indication of completion of text entry; and
an interface rendering module adapted to provide the first magnified view or the second magnified view for display on the screen.

17. The device of claim 16, wherein the interface rendering module is further adapted to provide the initial view for display on the screen, responsive to a detection of completion of text entry.

18. The device of claim 16, wherein the view magnification module is further adapted to generate a second magnified view of a second input field, responsive to a detection of completion of text entry; and wherein the interface rendering module is further adapted to provide the second magnified view for display on the screen.

19. The device of claim 16, wherein the predefined area is within a predetermined number of pixels of the input field.

* * * * *